Patented Dec. 1, 1942

2,303,604

UNITED STATES PATENT OFFICE 2,303,604

TREATMENT OF TARTAROUS LIQUORS

Geza Braun, New York, N. Y., assignor to Standard Brands Incorporated, New York, N. Y., a corporation of Delaware No Drawing. Application August 3, 1940, Serial No. 351,161

6 Claims. (Cl. 260—536)

This invention relates to a process for the treatment of tartarous material. More particularly, it pertains to the recovery of tartarous values from mother liquors, and includes correlated improvements and discoveries whereby such result may be effected.

The manufacture of tartaric acid and of Rochelle salt leads to mother liquors which are no longer useable due to the fact that any further crystallization leads to an impure product because of the accumulated impurities. These mother liquors have a relatively high tartaric acid content, e. g., 15–25%, and hence it is desirable that the tartaric acid be recovered sufficiently pure to be returnable to the processes in which it is utilized without causing a contamination thereof. The impurities usually found in the acid mother liquors are potassium salts, nitrogenous materials, coloring matter, etc., arising from the calcium tartrate used for tartaric acid production. Additionally, there are metallic salts of tartaric acid, such as iron, copper and lead, and also sulfuric acid, lead and calcium sulfates and some meso tartaric acid, racemic acid and other organic acids. Those liquors coming from Rochelle salt production are not as impure as those from the tartaric acid manufacture, but they do contain some of the same impurities as iron, copper and lead tartrates, sodium salts of organic acids and sodium hydroxide or sodium carbonate. It has previously been suggested that tartaric acid might be recovered from such liquors as calcium tartrate in the usual manner, and such tartrate purified by dissolving it in sodium carbonate and reprecipitating. This procedure, however, I have found yields a calcium tartrate which is very impure since it contains practically all of the metal impurities, particularly iron, copper and lead.

An object of the present invention is to provide a process in accordance with which tartarous values present in liquors may be advantageously obtained.

A further object of the invention is the provision of a process whereby the tartarous values present in tartaric acid and Rochelle salt mother liquors may be recovered.

An additional object of the invention is to provide a process which leads to an economical separation of tartarous values from liquors containing them, and in a condition of relatively high purity.

A more particular object of the invention is to provide a procedure in which tartarous values in mother liquors are obtained therefrom through neutralization in the form of potassium acid tartrate.

A specific object of the invention is to provide a process in which the mother liquors from tartaric acid production are neutralized with mother liquors from Rochelle salt production with attending formation and subsequent recovery of potassium acid tartrate.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention the tartarous material present in mother liquors, especially those arising in the manufacture of tartaric acid, and of Rochelle salt is obtained in the form of potassium acid tartrate. This is effected by neutralizing the mother liquors in the presence of a considerable quantity of a potassium salt, and obtaining potassium acid tartrate as a crystalline body. This may be carried out by neutralizing the mother liquors in the presence of a large excess of a potassium salt, e. g., potassium chloride, with alkaline Rochelle salt mother liquor, or with an alkali, or a combination of the alkaline mother liquor and an alkali. Desirably, the neutralization is carried to a pH value of about 2 to about 3.5, with the preferred value being 3.5. The amount of potassium chloride theoretically needed to produce potassium acid tartrate is about 55% of the tartaric acid content. I have found, however, that a decided excess leads to the ready formation of potassium acid tartrate; and inasmuch as the liquor contains some potassium salts, the addition of an amount which is 50% greater than that theoretically required suffices.

The foregoing treatment affords an excellent yield of potassium acid tartrate which is from 94–97% of the theoretical. This depends somewhat upon the extent to which the solution is cooled, and upon the excess amount of potassium salts present. When the solution contains a relatively large excess of these salts, and it is well cooled, there is obtained a higher yield. The potassium acid tartrate may be separated from the liquor in a suitable manner, as by means of a filter press, centrifuge or other mode of separation. Moreover, the product is of relatively high purity since it contains 92–97% potassium acid tartrate. The other materials present are calcium sulfate and small amounts of iron and various heavy metals. This product is well adapted for use in the manufacture of cream of tartar, i. e., a highly pure potassium acid tartrate, and of Rochelle salt. It may, however, also be employed in a process for the production of calcium tartrate.

The mother liquors are contaminated with a slimy material and with heavy metals, especially those from the manufacture of tartaric acid, and it is advisable that these liquors be purified before formation and crystallization of potassium acid tartrate, since otherwise this compound will be highly contaminated with the mentioned impurities. Inasmuch as the tartaric acid liquors are the more impure, it is necessary that they be more effectively purified. While this may be carried out in various ways, I have found a very satisfactory procedure to be the utilization of freshly precipitated calcium sulfate. An efficient and economical mode is to precipitate the calcium sulfate within the liquor, or in situ, and when such is done the insoluble impurities and the slimy materials are removed, with obtainment of a clear filtrate.

The Rochelle salt mother liquors are generally quite clear and free from suspended materials. Consequently, they do not require as vigorous a purification treatment, and this can usually be effected by addition of a small amount of a filter aid, and filtering. In order to clarify a tartaric acid mother liquor through the medium of freshly precipitated calcium sulfate, a quantity of such liquor, for example, 900 gallons containing about 4,000 lbs. of tartaric acid may be made up to 2,000 gallons with water or with weak wash liquors resulting from the process of previous charges. To this there may be added 200 lbs. of concentrated sulfuric acid, desirably with constant stirring, and the solution then heated to about 140° F., by means of live steam. Following this 50 gallons of milk of lime containing 100 lbs. of calcium oxide are slowly added, and after stirring, which may be about 15 minutes, the mass is filtered suitably through a press which has been precoated. The filter cake so formed may be washed free from acid with hot water, with the strong liquor and wash water being united, for recovery therefrom of tartarous material, whereas the last wash waters are employed for the dilution of a succeeding charge of mother liquor. The loss of tartaric acid is negligible, and hence the clarified liquor contains about 4,000 lbs. thereof. However, care should be exercised that an amount of sulfuric acid is present which is sufficient to overcome the tendency of the potassium acid tartrate to separate. Further, this amount depends upon the quantity of potassium salt present, and may be from 5 to 30% of the weight of the tartaric acid.

The foregoing procedure serves to bring about a removal of impurities from the tartarous liquors, and as an illustrative embodiment of a manner in which the tartarous values may be recovered from such liquor by neutralization, the following examples are presented:

I. *Precipitation with sodium hydroxide*

2,000 gallons of purified tartaric acid mother liquor may be placed in a vessel of adequate size, and thereto there may be added 2,000 lbs. of potassium chloride dissolved in 1,000 gallons of water. This amount of potassium chloride, together with the potassium salts occurring in the mother liquor, gives a sufficient excess to effect the separation of potassium acid tartrate. With the temperature of the solution at about 120° F., there may be slowly added, and with constant stirring, a 50% sodium hydroxide solution until the pH value of a filtered cold sample is about 3.3 to 3.5. Addition of the sodium hydroxide occasions a rise in temperature to about 150° F., whereupon the reaction mass is maintained at that temperature until the desired pH value is attained. The potassium acid tartrate gradually precipitates during the addition of sodium hydroxide; its precipitation is then completed by cooling of the reaction mixture to 60–80° F. The cream of tartar thus obtained may be separated either centrifugally or in a filter press. In either instance the tartrate is washed with cold water until it is free from salt, and the yield is from 96–97% theoretical. It will be realized that another alkali than sodium hydroxide may be used, e. g., sodium and potassium carbonates or potassium hydroxide. However, neutralization with sodium carbonate requires a rather long period because of marked foaming, and this may be considered as a disadvantage.

II. *Precipitation with Rochelle salt mother liquor*

About 1,000 gallons of purified tartaric acid mother liquor having a content of tartaric acid of about 2,000 lbs. may be diluted with about 1500 gallons of water. Thereto there may be added about 1200 lbs. of potassium chloride in 500 gallons of solution. The reaction mass is now heated to about 150° F., with constant stirring, and is neutralized to a pH value of about 3 by means of about 800 to 900 gallons of clarified Rochelle salt mother liquor. This liquor may have a Rochelle salt content which is equivalent to about 2,000 lbs. of tartaric acid. Thereafter the solution is cooled to 60–80° F., and the potassium hydrogen tartrate separated and washed, as in Example I.

III. *Precipitation with sodium hydroxide and Rochelle salt mother liquor*

About 2,000 gallons of purified tartaric acid mother liquor may be placed in a reaction vessel and then 2,000 lbs. of potassium chloride may be added in 1,000 gallons of solution. The temperature of the reaction mixture is usually about 100° F., and with constant stirring there is slowly added first 250 gallons of Rochelle salt mother liquor, and then a 50% sodium hydroxide solution until the pH value of the hot solution is about 3.0. The pH value of the cold solution will be from 3.3 to 3.5. During the sodium hydroxide addition the temperature rises to about 150° and is maintained until the desired pH is reached. The reaction mass is now cooled to 60 to 80° F. and the potassium hydrogen tartrate separated, as given in Example I.

The foregoing procedures present a manner in which the tartarous material present in tartaric acid and Rochelle salt mother liquors may be recovered quite readily and effectively. It will be realized that the specific conditions, as amounts, times, temperatures, concentrations and the like may be varied somewhat, and hence that the invention is not specifically limited to those which are given. Further, a potassium salt other than potassium chloride may be used, for example, the sulfate, and instead of the pure potassium chloride utilization may be made of a crude solution thereof, as that which is obtained in the manufacture of calcium tartrate from argols. Such a solution, however, usually contains suspended calcium tartrate as well as other materials, and accordingly should be clarified. Instead of a separate clarification the potassium chloride solution may be added to unclarified tartaric acid mother liquor and clarified in conjunction therewith. When this is done it is desirable to have sulfuric acid present in an amount of about 25% of the weight of the tartaric acid in order to obviate precipitation of potassium acid tartrate.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the treatment of liquors containing tartarous values which comprises neutralizing a tartaric acid mother liquor to a pH value of 2 to 3.5 in the presence of an amount of a potassium salt which is at least 50% greater than that theoretically required to react with tartaric acid to form potassium acid tartrate, with formation and precipitation of cream of tartar, and separating cream of tartar thus obtained.

2. A process for the treatment of liquors containing tartarous values which comprises neutralizing a tartaric acid mother liquor to a pH value of 2 to 3.5 in the presence of an amount of potassium chloride which is at least 50% greater than that theoretically required to react with tartaric acid to form potassium acid tartrate, with formation and precipitation of cream of tartar, and separating cream of tartar thus obtained.

3. A process for the treatment of liquors containing tartarous values which comprises neutralizing a tartaric acid mother liquor with a Rochelle salt mother liquor to a pH value of 2 to 3.5 at a temperature of about 150° F., and in the presence of an amount of potassium chloride which is at least 50% greater than that theoretically required to react with tartaric acid to form potassium acid tartrate, with formation and precipitation of cream of tartar, and separating cream of tartar thus obtained.

4. A process for the treatment of liquors containing tartarous values which comprises neutralizing a tartaric acid mother liquor with sodium hydroxide in conjunction with a Rochelle salt mother liquor to a pH value of about 2 to about 3.5 in the presence of an amount of a potassium salt which is at least 50% greater than that theoretically required to react with tartaric acid to form potassium acid tartrate, with formation and precipitation of cream of tartar, and separating cream of tartar thus obtained.

5. A process which comprises purifying a tartaric acid mother liquor by incorporating therewith freshly precipitated calcium sulfate, removing calcium sulfate therefrom, and neutralizing the thus purified liquor to a pH value of 2 to 3.5 in the presence of an amount of a potassium salt which is at least 50% greater than that theoretically required to react with tartaric acid to form potassium acid tartrate, with formation and precipitation of cream of tartar, and separating cream of tartar thus obtained.

6. A process which comprises purifying a tartaric acid mother liquor by forming calcium sulfate in situ through interaction between sulfuric acid and calcium hydroxide, removing calcium sulfate therefrom, and neutralizing the thus purified liquor to a pH value of 2 to 3.5 in the presence of an amount of a potassium salt which is at least 50% greater than that theoretically required to react with tartaric acid to form potassium acid tartrate, dith formation and precipitation of cream of tartar, and separating cream of tartar thus obtained.

GEZA BRAUN.